Nov. 9, 1965    K. SCHRÖTER    3,216,545
MULTIPLE FRICTION CLUTCHES
Filed Dec. 6, 1963    2 Sheets-Sheet 1

INVENTOR
KURT SCHRÖTER
BY Toulmin & Toulmin
ATTORNEYS

United States Patent Office 3,216,545
Patented Nov. 9, 1965

3,216,545
MULTIPLE FRICTION CLUTCHES
Kurt Schröter, Lohmar, Germany, assignor to Jean Walterscheid KG, Lohmar, Lohmar, Germany
Filed Dec. 6, 1963, Ser. No. 328,585
Claims priority, application Germany, Dec. 29, 1962, W 33,624
4 Claims. (Cl. 192—48)

This invention relates to clutches and in particular to friction clutches, and is especially concerned with a friction clutch for driving two concentric shafts and with there being a torque control means pertaining to the clutch with respect to at least one of the driven shafts.

An object of the present invention is to provide, in combination with a friction clutch having alternately controlled engagement pressure of a second friction clutch selectively engageable and disengageable.

Another object of the present invention is the provision of a double friction clutch with the individual clutches being selectively and jointly engageable and disengageable, and with one of the clutches having torque controlling means pertaining thereto.

A still further object is the provision of a friction clutch for controlling the driving of two concentric shafts which substantially is as compact as a single clutch but which is relatively inexpensive to manufacture.

Still another object of the present invention is the provision of a double friction clutch which can operate as a double coupling device while being relatively compart and inexpensive to manufacture, and which is also easy to operate.

These and other objects and advantages of this invention will become more apparent upon reference to the following specification taken in connection wtih the accompanying drawings, in which.

Figure 2:
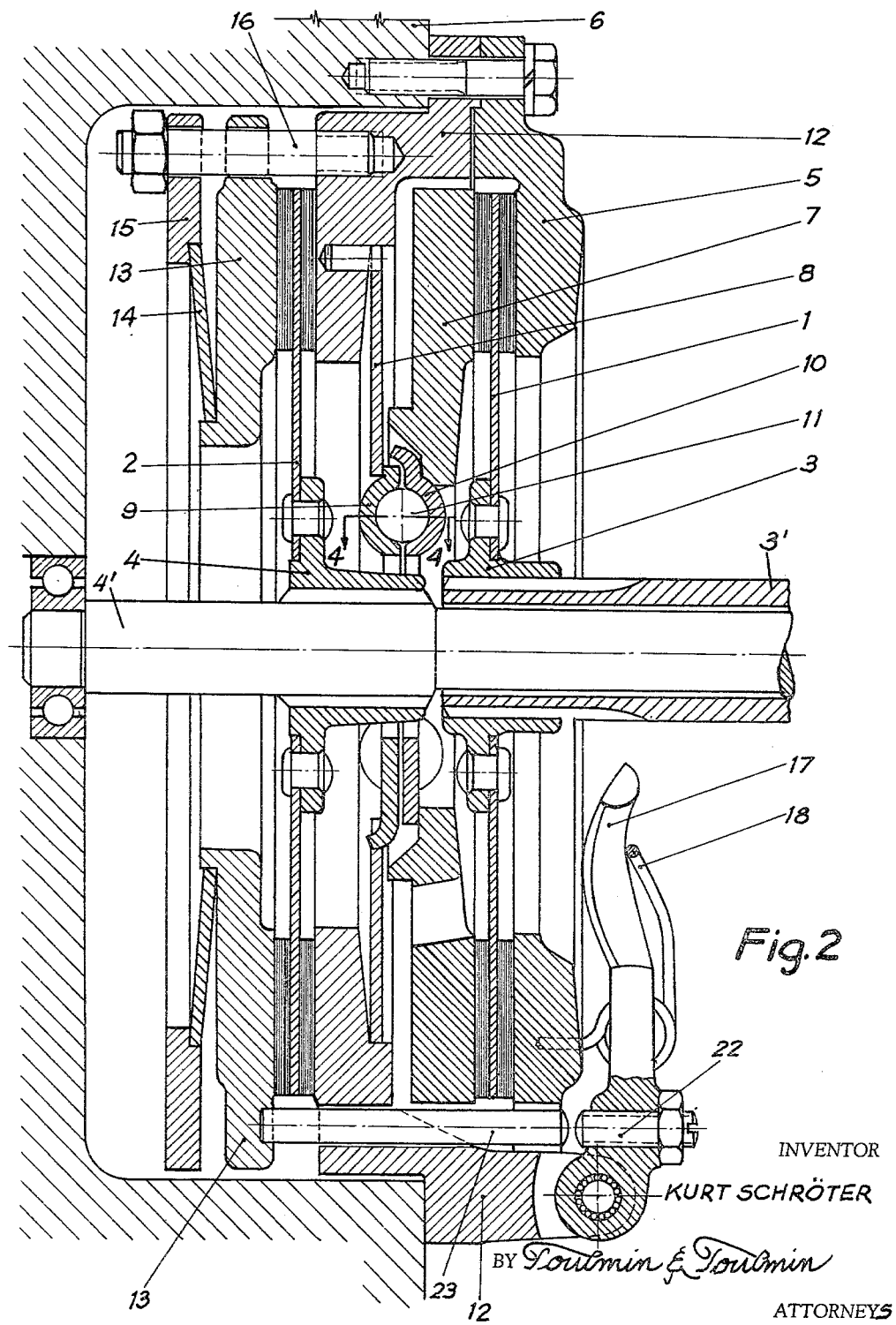
FIGURE 2 is a sectional view indicated by line II—II on FIGURE 1.

Referring to the drawings somewhat more in detail, and with particular reference to FIGURE 2, the double clutch shown therein comprises the two clutch discs 1 and 2 co-axially arranged on their respective hubs 3 and 4 which are splined to the ends of their respective shafts 3' and 4'.

Figure 1:
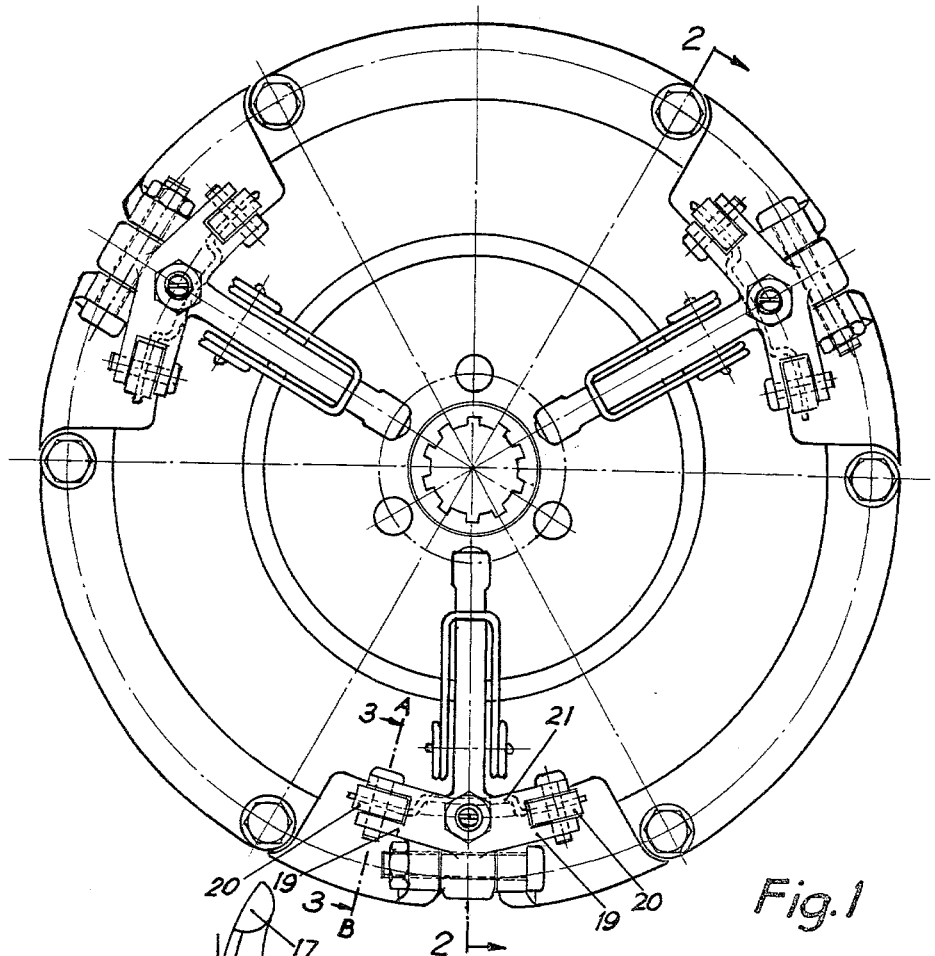
FIGURE 1 is an end view of the clutch arrangement of the present invention looking in at the side thereof from which the shafts driven thereby extend.

The clutch discs preferably have friction facings mounted on the opposite faces thereof for engagement with the adjacent pressure plates and pressure rings. On the right side of FIGURE 1 is a pressure ring 5 which is bolted to member 6 which has a recess therein for receiving the clutch. Member 6 may, for example, comprise a driven fly wheel. On the opposite side of disc 1 there is the axially movable pressure plate 7 which is connected with member 10 having concave recesses therein in which are mounted rollers 11, and which also extend into recesses in a second member 9. Parts 9, 10 and 11 form a cam mechanism that tends to maintain constant the torque transmitted into clutch disc 1 for the driving of outer tubular shaft 3'.

The aforementioned member 9 is engaged by the inner end of a prestressed plate spring 8, the outer periphery of which non-rotatably engages a pressure ring 12 which is also fixedly connected to member 6.

Plate spring 8 has a downwardly sloping characteristic curve and this feature, in combination with the cam mechanism 9, 10, 11 serves to maintain substantially constant the production of the clutch friction and the spring tension as it pertains to clutch disc 1, thereby controlling the maximum torque to be transmitted into clutch disc 1.

The aforementioned clutch disc 2 is arranged so that the facing on the right side thereof is engageable with pressure ring 12 while on the left side, disc 2 is engageable by pressure plate 13. Pressure plate 13 is acted upon by a prestressed plate spring 14, the outer periphery of which engages abutment ring 15 adjustably supported on pressure ring 12 by bolts 16.

For actuating the clutch, there are provided actuating levers 17 pivotally mounted on pressure ring 12 acted upon by wire-like spring means 18 so that the ends of the levers nearest the center of the clutch are urged toward the clutch.

Each lever 17 has brackets 19 that carry rollers 20. These rollers engage plate elements 21 that are bolted to the periphery of pressure plate 7 at spaced points thereabout. The arrangement of the levers 17, bracket portions 19, the aforementioned rollers 20 and the plates 21 will be seen in FIGURE 1.

Each lever 17 also carries an adjustable abutment screw 22 aligned with a corresponding abutment rod 23 extending through pressure ring 12 and at its inner end abutting pressure plate 13.

Figure 3:
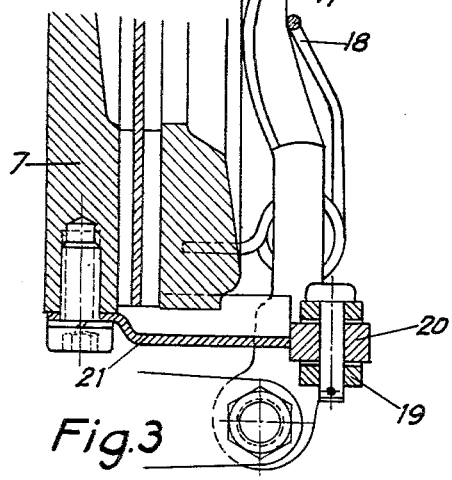
FIGURE 3 is a fragmentary sectional view indicated by line III—III on FIGURE 1.

In operation, counterclockwise movement of levers 17, as they are viewed in FIGURE 2 and 3, will first move pressure plate 7 away from disc 1 to interrupt the transmission of torque into disc 1, and thereafter screws 22 will abut rods 23 and push pressure plate 13 away from its disc 2 and interrupt the transmission of power into disc 2. The clutch is again engaged by moving the levers in the opposite direction.

It will be evident that screws 22 can be adjusted to vary the sequence of operation so that clutch disc 2 can be operated simultaneously with clutch disc 1 if so desired, or operated before clutch disc 1.

Figure 4:
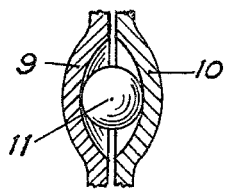
FIGURE 4 is a fragmentary sectional view indicated by line IV—IV on FIGURE 2 showing in cross section the mechanism for controlling the spring tension pertaining to one of the clutches and thereby controlling the transmitting turning moment.

The general arrangement of the cam mechanism 9, 10, 11 is shown in FIGURE 4 and the connection between levers 17 and pressure plate 7 is disclosed in FIGURE 3.

It will be understood that this invention is susceptible to modification in order to adapt it to different usages and conditions; and accordingly, it is desired to comprehend such modifications within this invention as may fall within the scope of the appended claims.

What I claim is:

1. In a friction clutch; a first clutch disc, a pressure ring on one side of said first disc and an axially movable pressure plate on the opposite side thereof, a first plate spring having a declining characteristic curve and urging said pressure plate toward said pressure ring to grip said first disc therebetween, control means interposed between said first spring and said first pressure plate at the inner periphery thereof, said means comprising a cam mechanism operable in response to slipping of said first disc on its pressure ring to vary the thrust of said spring to maintain the product of the tension of said first spring and the slipping of said first clutch disc within predetermined limits, a second clutch disc, a second pressure ring on one side of said second disc and a second pressure plate on the other side thereof, a second spring biasing said second pressure plate toward said second pressure ring, a housing to which said pressure rings are rigidly connected to form a unit, and clutch actuating means on said unit for moving said pressure plates simultaneously or sequentially away from their respective discs to interrupt the transmission of torque into said discs.

2. In a friction clutch; a first clutch disc, a pressure ring on one side of said first disc and an axially movable pressure plate on the opposite side thereof, a first plate spring having a declining characteristic curve and urging said pressure plate toward said pressure ring to grip said first disc therebetween, control means interposed between said first spring and said first pressure plate at the inner periphery thereof operable in response to slipping of said first disc on its pressure ring to vary the thrust of said spring to maintain the product of the tension of said first spring and the slipping of said first clutch disc within predetermined limits, a second clutch disc, a second pressure ring on one side of said second disc and a second pressure plate on the other side thereof, a second spring biasing said second pressure plate toward said second pressure ring, a housing to which said pressure rings are rigidly connected to form a unit, and clutch actuating means on said unit for moving said pressure plates simultaneously or sequentially away from their respective discs to interrupt the transmission of torque into said discs, said control means comprising first and second control members connected respectively to said first spring and said first pressure plate and having depressions therein facing each other, and rollable control elements in said depressions to vary the thrust of said spring upon slippage of said first disc relative to its pressure ring.

3. A friction clutch according to claim 2 in which said housing includes a recess having a bottom and in which at least said second clutch disc is disposed, said second pressure plate being disposed between said second disc and the bottom of the recess, an abutment ring between the bottom of the recess and the second pressure plate, said second spring bearing between said abutment ring and said second pressure plate, and means fixing said abutment ring to said second pressure ring and holding said second pressure plate non-rotatable but axially movable in said housing.

4. In a friction clutch; a housing having a recess having a mouth, a friction clutch comprising a pressure ring secured to said housing about the mouth of said recess, a clutch disc on the side of said pressure ring toward the inside of said recess, a pressure plate on the side of the disc opposite said pressure ring, an abutment ring on the side of said pressure plate opposite said disc, bolt means connecting said abutment ring to said pressure ring and slidably non-rotatively supporting said pressure plate, a prestressed plate spring bearing between said abutment ring and pressure plate, another pressure ring secured to said housing on top of the first mentioned pressure ring, another clutch disc inside said other pressure ring, another pressure plate between said other clutch disc and the first mentioned pressure ring, another plate spring bearing between said first mentioned pressure ring and said other pressure plate, control means connecting said other plate spring to said other pressure plate responsive to angular movement of said other pressure plate in the housing to vary the thrust of said other spring, said clutch discs being co-axial, telescoping shafts respectively drivingly connected to said discs, and actuating lever means pivoted on said other pressure ring having abutting connections with said pressure plates for moving the pressure plates away from their respective discs.

References Cited by the Examiner

UNITED STATES PATENTS 2,899,897 8/59 Ludwig.

FOREIGN PATENTS 42,802 11/33 France.
70,539 5/59 France.
940,011 10/63 Great Britain.

DAVID J. WILLIAMOWSKY, *Primary Examiner.*